United States Patent
Reichelt et al.

(10) Patent No.: US 9,057,023 B2
(45) Date of Patent: Jun. 16, 2015

(54) METHOD AND DEVICE FOR KEEPING COKE FURNACE CHAMBERS HOT WHEN A WASTE HEAT BOILER IS STOPPED

(75) Inventors: Hans-Joachim Reichelt, Hattingen (DE); Helmut Schulte, Essen (DE)

(73) Assignee: THYSSENKRUPP UHDE GMBH, Dortmund (DE)

(*) Notice: Subject to any disclaimer, the term of this patent is extended or adjusted under 35 U.S.C. 154(b) by 710 days.

(21) Appl. No.: 13/381,767

(22) PCT Filed: May 5, 2010

(86) PCT No.: PCT/EP2010/002743
§ 371 (c)(1),
(2), (4) Date: Mar. 5, 2012

(87) PCT Pub. No.: WO2011/000447
PCT Pub. Date: Jan. 6, 2011

(65) Prior Publication Data
US 2012/0152720 A1    Jun. 21, 2012

(30) Foreign Application Priority Data
Jul. 1, 2009  (DE) .......................... 10 2009 031 436

(51) Int. Cl.
*C10B 21/04*  (2006.01)
*C10B 49/02*  (2006.01)
(Continued)

(52) U.S. Cl.
CPC .............. *C10B 15/02* (2013.01); *C10B 49/02* (2013.01); *C10B 21/12* (2013.01); *C10B 21/04* (2013.01); *C10B 21/18* (2013.01); *C10B 21/20* (2013.01); *C10B 29/00* (2013.01); *F22B 1/18* (2013.01)

(58) Field of Classification Search
CPC ........ C10B 21/04; C10B 21/12; C10B 21/18; C10B 21/20; C10B 49/02
USPC ........ 201/15, 26, 27, 37; 202/91, 93, 94, 270; 422/168
See application file for complete search history.

(56) References Cited

U.S. PATENT DOCUMENTS 3,451,896 A * 6/1969 Schon .............................. 201/15
4,039,391 A * 8/1977 Gensler .......................... 201/36
(Continued)

FOREIGN PATENT DOCUMENTS

DE    3701875    8/1987
WO    0118150    3/2001

OTHER PUBLICATIONS

International Search Report for PCT/EP2010/002743, English translation attached to original, Both Completed by the European Patent Office on Oct. 11, 2010, All together 7 Pages.
(Continued)

*Primary Examiner* — Nina Bhat
*Assistant Examiner* — Jonathan Miller
(74) *Attorney, Agent, or Firm* — Brooks Kushman P.C.

(57) ABSTRACT

A process for keeping coke oven chambers hot during the stoppage of a waste heat boiler. The coke oven chambers are kept hot after emptying using externally heated burners, in which a flue gas low in pollutants is obtained from the burners. The waste heat boilers which, during normal operation, cool the flue gases can be shut off and overhauled, and a flue gas low in pollutants which can be dissipated directly into the atmosphere is obtained by the burner operation. Also disclosed is an apparatus for keeping coke oven chambers hot, the apparatus has a coke oven chamber bench, a flue gas collection line, a flue gas chimney, a waste heat boiler, a waste gas collection line and a waste gas purification system, wherein the flue gas chimney and the waste heat boiler can be shut off on the flue gas side and on the waste gas side.

7 Claims, 1 Drawing Sheet

(51) Int. Cl.
*C10B 15/02* (2006.01)
*C10B 21/12* (2006.01)
*C10B 21/18* (2006.01)
*C10B 21/20* (2006.01)
*C10B 29/00* (2006.01)
*F22B 1/18* (2006.01)

(56) References Cited

U.S. PATENT DOCUMENTS

| | | | |
|---|---|---|---|
| 4,045,299 A | | 8/1977 | MacDonald |
| 4,124,450 A | * | 11/1978 | MacDonald .................... 201/15 |
| 4,216,060 A | * | 8/1980 | Murata et al. ................. 202/139 |
| 4,470,800 A | * | 9/1984 | Wolf ............................. 431/285 |
| 4,921,579 A | * | 5/1990 | Severin .......................... 201/41 |
| 4,986,199 A | * | 1/1991 | Komeno et al. ............... 110/347 |
| 6,139,692 A | * | 10/2000 | Tamura et al. .................. 201/41 |
| 7,263,934 B2 | * | 9/2007 | Copeland et al. ............. 110/346 |
| 2011/0167783 A1 | * | 7/2011 | Tanabe et al. ............. 60/39.461 |
| 2011/0253521 A1 | * | 10/2011 | Kim ................................ 201/17 |

OTHER PUBLICATIONS

Website, D'Lima et al. http://segagoa.com/pdf/2001ironore.pdf, "Sesa Energy Recovery Ovens." 2001 Ironmaking Conference Prodeedings, p. 595-602; Date (2001).

Walker et al. The Journal of Metallurgy Mar. 2003, vol. 100, No. 3, p. 233-241, "Sun Coke Company's heat recovery cokemaking technology. High coke quality and low environmental impact."

Website, Waddell et al. http://owpubauthor.epc.gov/scitech/wastetech/guide/ironsteel/upload/1999_11_15_guide_ironsteel_jewell.pdf, 25 Pages "Heat-Recovery Cokemaking Presentation." Date: (1999).

* cited by examiner

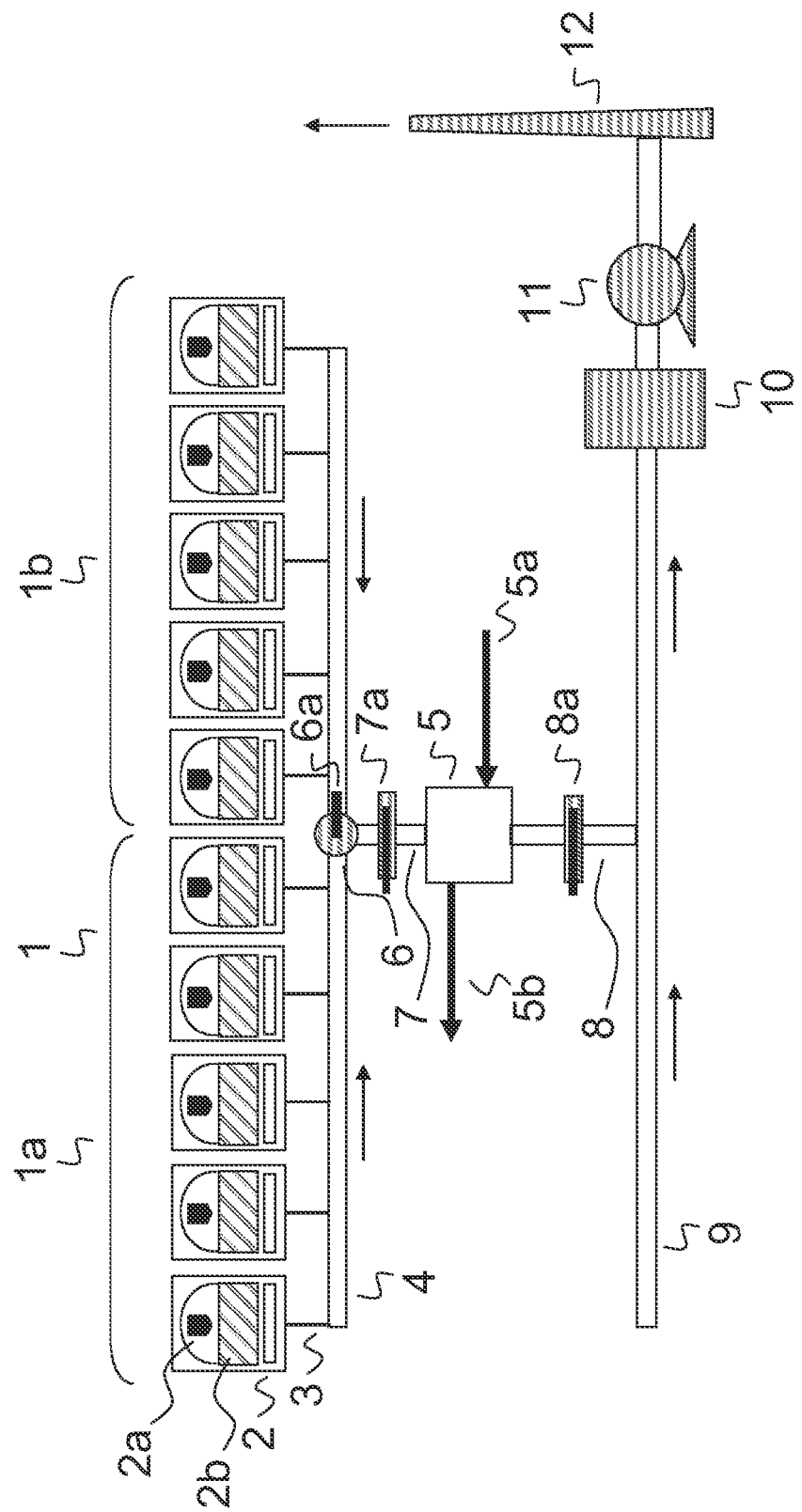

METHOD AND DEVICE FOR KEEPING COKE FURNACE CHAMBERS HOT WHEN A WASTE HEAT BOILER IS STOPPED

CROSS-REFERENCE TO RELATED APPLICATION

This application is the U.S. national phase of PCT Appln. No. PCT/EP2010/002743 filed May 5, 2010 which claims priority to German application DE 10 2009 031 436.9 filed Jul. 1, 2009, the disclosures of which are incorporated in their entirety by reference herein.

BACKGROUND

The invention relates to a process for avoiding the dissipation of unpurified flue gas from the coke oven process during the stoppage times of individual waste heat boilers, wherein said waste heat boiler serves for producing steam or hot water during the operation of at least one coke oven chamber, and the process makes it possible to keep the coke oven chambers of a battery of coke ovens hot, wherein the coke oven chambers are kept hot not by coking but by externally heated burners, the pollutant emission of which is low owing to the manner of the heating, such that a reduced emission of pollutants is effected during the stoppage. The invention also relates to an apparatus for keeping coke oven chambers hot during the stoppage of a waste heat boiler, said apparatus comprising coke oven chambers which comprise at least one externally heated burner, where "externally heated" is to be understood as meaning in particular a gas-heated or oil-heated burner.

During the operation of coke oven chambers, it is necessary to overhaul or clean the so-called waste heat boiler from time to time or at regular intervals. In normal operation, the waste heat boiler serves for cooling the flue gases from at least one coke oven chamber and for obtaining steam or hot water from the heat which is thus obtained. These waste heat boilers are often also referred to as recuperators and the associated technology is referred to as heat-recovery technology. During an overhaul or cleaning, however, these waste heat boilers have to stop, and are therefore no longer available for cooling the flue gas. It is often the case that the coking process in the coke oven chamber is continued, and therefore the hot flue gases, which are often laden with a considerable quantity of pollutants, have to be emitted into the atmosphere in an unpurified state. This is undesirable. The cooling down of the coke oven chamber for overhaul or cleaning purposes results in the refractory structure of the coke oven chambers being damaged, and this is not carried out for this reason.

There is therefore a need to find a process with which the coke oven, chambers of a coke oven bench can be kept hot without pollutant-containing coking gases being undesirably emitted. Coke oven chambers are often combined to form groups, since the cycle of charging, coking and emptying of coke oven chambers is not continuous and is therefore distributed over a plurality of coke oven chambers. Groups of coke oven chambers are also referred to as coke oven chamber benches. Typical coke oven chambers of the heat-recovery type use the coking gas obtained during the coking for combustion and therefore for producing heat.

The completely combusted flue gas thus obtained, which can be taken from the combustion chamber, is guided into a collection line, which is placed transversely with respect to the coke oven chambers, receives the hot flue gases from each coke oven chamber and guides said gases via an export line into the waste heat boiler or boilers. The waste heat boilers cool the flue gas by indirect heat exchange for producing steam or hot water, such as to give a cooled waste gas. This is often guided through a waste gas purification system. An apparatus for removal by suction and for producing a negative pressure in order to suck the combustion air into the oven chambers is arranged downstream of the waste gas purification. If the waste heat boiler is no longer being used for cooling the flue gas, it is also the case that the waste gas purification system is no longer available. During stoppage of the waste heat boilers, however, the coke oven chambers continue to operate, for the reasons mentioned, and the flue gas is conducted away via a directly connectable flue gas chimney, such that a considerable quantity of pollutants which are present in the completely combusted coking gas passes into the atmosphere.

U.S. Pat. No. 4,045,299 A describes an arrangement of coke oven chambers with coke oven chamber side walls, coke oven chamber front doors, charging openings in the roof and a coke oven chamber floor, onto which the coal cake for coking is charged. Secondary air soles are located underneath the floor, and these are connected via channels in the sides of the coke oven chamber to the gas chamber above the coke cake. In turn, the secondary air soles are connected to a post-combustion chamber, which is equipped with externally heated burners, as a result of which uncombusted residual gases in the coking gas can be completely combusted before they are introduced into the recuperator. If need be, the post-combustion chamber can be supplied with coking gas from the gas chamber above the coke cake, such that the flue gas is always completely combusted and is provided with a temperature which is suitable for flue gas combustion. However, the structure serves for ensuring complete combustion at a minimum temperature level, not for heat retention.

Rick Waddell et al. describe a process in which a number of coke oven chambers are combined to form a coke oven bench for producing coke and this bench is connected in each case in pairs or multiply to a waste heat boiler, wherein an emergency chimney is located upstream of the waste heat boiler and a waste gas purification system is located downstream of the waste heat boiler, and the hot purified waste gas is used via the waste heat boiler for generating electricity. The process does not disclose any possible ways of avoiding a continued flow of pollutant-containing flue gas into the atmosphere when the waste heat boiler is shut off. In addition, the process does not disclose any possible way of keeping coke oven chambers hot during the stoppage of the waste heat boiler.

In the article "Sun Coke Company's heat-recovery coke-making technology high coke quality and low environmental impact", Revue de metallurgie, cahiers d'informations techniques, Revue de metallurgie, Paris, Fr. vol. 100, no. 3, pages 233-241, dated Mar. 1, 2003, D. N. Walker et al. describe a novel system for producing coke which produces coke proceeding from various types of coal, wherein the coke has a defined stability and a defined proportion of volatile constituents depending on the type of coal used, and the system consists of coke oven chambers, which comprises a coke oven chamber with downcomer channels, an oven floor, a coke oven sole, upwardly directed flue gas channels, a flue gas channel arranged the coke oven chambers, an emergency chimney, a waste heat boiler with a secondary electricity generating unit, and a waste gas purification system with a downstream waste gas chimney. The system described in the article does not disclose any possible way of continuing the coking cycle during the stoppage of a waste heat boiler without conducting pollutant-containing flue gas into the atmosphere.

WO 01/18150 A2 describes a process for producing coke using a system for recovering energy with low investment costs at emission levels which lie well below permissible waste gas standards, wherein this system is equipped with a waste gas channel which has inlets for the admission of tertiary air in order to allow for complete combustion of the combustible constituents, such that the waste heat boilers receive an influx of pollutant-free waste gas, and the production process proceeds with low emission levels and good environmental compatibly, and at the same time electrical energy is produced at low cost per kilowatt hour. The article does not describe any additional burners in the coke oven chambers for heat retention or continued production of hot and pollutant-free flue gas during stoppage of waste heat boilers.

In their article "Sesa Energy Recovery Ovens", Ironmaking Conference Proceedings 2001, P. F. X. D'Lima et al. describe a process for producing coke from a system for producing coke in accordance heat-recovery process, which comprises 84 coke oven chambers in two batteries each of 42 coke oven chambers, wherein the emissions are kept low by the use of low-sulfur type of coal, and an additional admission of tertiary air ensures that the carbon monoxide content of the waste gas is low, and an excess oxygen content of above 6% is present in the waste gas, such that all the particles in the waste gas are combusted. The article does not describe any additional burners in the coke oven chambers for heat retention or the continued production of hot and pollutant-free flue gas during the stoppage of the waste heat boilers.

The problem which arises during the stoppage of waste heat boilers is the cooling of the coke oven chambers. Coke oven chambers are ordinarily constructed from materials which have to withstand high temperatures but, owing to their properties, can be damaged upon cooling. Certain materials can change their properties at relatively low temperatures, and therefore these are unusable for the desired purpose.

SUMMARY OF THE INVENTION

The object is therefore that of providing an apparatus which ensures that the coke oven chambers are at a minimum temperature during the stoppage of the waste heat boilers, without excessive emission of flue gases into the atmosphere. Since the waste gas purification system is no longer available during stoppage of the waste heat boilers, it should nevertheless be possible to keep the coke oven chambers at a minimum temperature without flue or waste gases being emitted by continuing coking. It is not possible to bypass the waste heat boiler, because in this time the flue gases would pass uncooled into the flue gas purification system. However, this is undesirable or impossible for technical reasons. It is also desirable to avoid the emission of unpurified gases as far as possible.

The invention achieves this object by virtue of a process which ensures that coke oven chambers are kept hot during the stoppage of a waste heat boiler by virtue of the fact that the coke oven chambers are each equipped with at least one externally heated burner, wherein the collection line, is equipped with a shut-off apparatus upstream of the entry of the flue gas into the waste heat boiler in the gas flow direction, and said collection line is furthermore equipped with a flue gas chimney which exports the flue gas vertically upward upstream of the shut-off apparatus in the gas flow direction. It is thereby possible for the coke over chambers to be further heated after they have been emptied without the waste heat boilers having to be used, while at the same time harmful cooling and reheating of the coke oven chambers and the emission of flue gases from the coking process is avoided.

Coke oven chambers of the heat-recovery type can be operated using the process according to the invention. These are preferably coke oven chambers which export the completely combusted coking gas as flue gas. These are arranged in groups so as to form so-called coke oven benches. The coke oven chambers can be arranged in any desired manner within the coke oven benches. It is thus possible, using the process according to the invention, to operate a coke oven bench in which only two coke oven chambers are arranged within a coke oven bench. However, it is possible for any desired number of coke oven chambers to be arranged within a coke oven bench. By way of example, these may be two coke oven chambers arranged mirror-symmetrically in a coke oven bench. In principle, the number of waste heat boilers can be arbitrary, too. These can be linked to the coke oven benches or coke oven chambers in any desired manner.

In this case, there may be one or multiple burners arranged for each coke oven chamber, it being preferable for one burner to be installed for each coke oven chamber. There is typically one burner arranged in each coke oven chamber. In a typical embodiment, in each coke oven chamber these heat the gas chamber above the coke cake of an empty coke oven chamber located there during operation. The burners are preferably operated by natural gas, by a hydrocarbon-containing fuel gas or by a liquid fuel.

The invention is an apparatus for keeping coke oven chambers hot during the stoppage of a waste heat boiler, which comprises

- at least two coke oven chambers, which are combined to form a coke oven bench,
- at least one collection line, which receives the hot flue gases from the combustion of the coking gas and which issues into a common export line,
- a waste heat boiler, which is supplied with hot flue gases from said export line and which is equipped with at least one feed line for boiler feedwater and a discharge line for steam or hot water and an export line for cooled waste gas, wherein indirect transfer of heat from the hot flue gases from the combustion of the coking gas to the boiler feedwater cooling medium is made possible, wherein
- the collection line is equipped with a shut-off apparatus upstream of the entry of the flue gas into the waste heat boiler in the gas flow direction, and said collection line is furthermore equipped with a waste gas chimney which exports the waste gas vertically upward upstream of the shut-off apparatus in the gas flow direction,
- a waste gas line, which exports the cooled waste gas from the waste heat boiler, said waste gas line being equipped with a shut-off apparatus for flue gas,
- a waste gas purification system, which purifies the cooled waste gas from the waste heat boiler for emission-free exportation into the atmosphere,
- and which is characterized in that
- the coke oven chambers are equipped with at least one externally heated burner, and
- at least one burner is arranged at each coke oven chamber and can be used to heat the coke oven chamber.

The flue gas chimney leads out of the collection line into the atmosphere and serves to pass the flue gas from the burners into the atmosphere. In an advantageous embodiment, said chimney is arranged upstream of the export line into the waste heat boilers. The flue gas chimney is advantageously equipped with a shut-off apparatus. By way of example, this shuts off the flue gas chimney with respect to the atmosphere during normal operation. By providing at least one burner for each coke oven chamber, it is possible for the waste heat boiler to be decommissioned for any desired length of time, since all of the coke oven chambers are heatable with pollutant-free flue gas during the stoppage of the waste heat boiler in continuous operation.

The waste heat boiler can be of any kind whatsoever. On the flue gas side, it is connected to the feed line for flue gas, and on the waste gas side it is connected to the export line for waste gas. For indirect heat exchange, it is provided with a feed line for feedwater and a discharge line for steam or hot water.

To carry out the invention, it is necessary to provide the waste heat boiler with a shut-off apparatus on the flue gas side. Examples of these are flaps, slides or shut-off plates. In a preferred embodiment, the waste heat boiler is provided with a shut-off apparatus both on the flue gas side and on the waste gas side.

The apparatus according to the invention comprises a waste gas purification system, which is of any kind whatsoever. By way of example, the apparatus according to the invention can be provided with a suction fan for the cooled waste gas, which fan can be used to produce a negative pressure. Said fan is used to control the negative pressure in the coke oven chamber. The suction fan is preferably installed downstream of the waste gas purification system. A waste gas chimney may be located downstream of the waste gas purification system.

The invention is also a process in which with which the coke oven chambers are kept hot during the stoppage of coke oven chambers.

The invention in particular is a process for keeping coke oven chambers hot during the stoppage of a waste heat boiler, in which process

- at least two coke-oven chambers are combined to form a coke oven bench of the heat-recovery type, and a distinction is made between an operational period and a stoppage period of the coke oven bench, and
- during the operational period, the coking as is used to heat the coke cake by combustion with air and to supply the heat required for coking, such that a hot flue gas is produced, which is guided into a waste heat boiler were said flue gas is used to produce steam or hot water, and
- during the operational period, the hot flue gas is guided via a collection line from the coke chamber ovens into the waste heat boiler and through a waste gas purification system, which purifies the cooled waste gas from the waste heat boiler for emission-free exportation into the atmosphere, and
- during the stoppage period, the coke oven chambers are emptied, such that they no longer contain any coal or any coke,
- and which is characterized in that
- during the stoppage period, the coke oven chambers are kept hot using an externally fueled burner, such that a hot flue gas, which comes from the flue gas of the burners, is also provided during the stoppage period, and
- during the stoppage period, the gas flow in the collection, line is shut off upstream of the entry of said gas into the waste heat boiler, the hot flue gas of the burners being conducted not into the waste heat boiler but into a flue gas chimney, which is located upstream of the waste heat boiler, as a result of which
- excessive emission of pollutants during the stoppage of waste heat boilers of coke oven benches is avoided.

The burners can be of any kind whatsoever. By way of example, they can be heated with natural gas. However, it is also possible to fuel said burners with another gas, or with liquid fuels. The fuels preferably contain hydrocarbons.

The apparatus according to the invention and the process according to the invention afford the advantage of avoiding excessive emission of pollutants during the stoppage of waste heat boilers of coke oven benches.

BRIEF DESCRIPTION OF THE DRAWING

The apparatus according to the invention will be explained with reference to a drawing, this drawing merely being an exemplary embodiment of the construction of the apparatus according to the invention.

DETAILED DESCRIPTION OF THE INVENTION

In an arrangement (1) of two coke oven benches consisting of a first coke oven bench (1a) and a second coke oven bench (1b), five coke oven chambers (2) are arranged in each of two coke oven benches. Each coke oven chamber (2) can be equipped with a burner (2a), which heats the respective coke oven chamber. Each coke oven chamber (2) is provided via a flue gas channel (3) with a collection line (4) for flue gas, through which the collection line (4) is supplied with flue gases from the flue gas channels (3). The collection line (4) issues into a common discharge line, which in turn issues into the waste heat boiler (5). A flue gas chimney (6) which leads vertically upward is located upstream of the waste heat boiler (5) and can be shut off via a shut-off apparatus (6a). The discharge line (7) can also be shut off via a shut-off apparatus (7a) upstream of the entry of said gas into the waste heat boiler (5) in the gas flow. The discharge line (7) finally issues into a waste heat boiler (5), which is supplied with feedwater (5a) and produces steam or hot water (5b) via indirect heat exchange. A cooled waste gas is obtained as a result. This is guided into a waste gas collection line (9) via an exit line for waste gas (8). The exit line for waste gas (8) is likewise provided with a shut-off apparatus for the exit line for waste gas (8a). The waste gas collection line (9) finally issues into a waste gas purification system (10). A fan (11) is located downstream of the waste gas purification system (10) and produces a negative pressure. The purified waste gas is guided into a waste gas chimney (12).

To carry out the invention, burners (2a) are located in each coke oven chamber (2) in the gas chamber above the coke cake (2b) and, after the coke oven chamber has been emptied, heat the empty coke oven chambers (2) and supply them with hot flue gases during the stoppage period. In this case, the shut-off apparatus (7a) upstream of the waste heat boiler (5) is closed and the shut-off apparatus (6a) in the flue gas chimney is opened. The hot flue gas from the burners (2a), which is low in pollutants, is conducted into the atmosphere. The coke oven chambers (2) thus do not cool, while at the same time the waste heat boiler (5) can be overhauled and/or cleaned.

LIST OF REFERENCE SYMBOLS

1 Coke oven bench
1a First coke oven bench
1b Second coke oven bench
2 Coke oven chamber
2a Burner
2b Coal/coke cake
3 Flue gas channel
4 Collection line for flue gas
5 Waste heat boiler
5a Feedwater feed
5b Steam/hot water withdrawal 6 Flue gas chimney
6a Shut-off apparatus in the flue gas chimney
7 Exit line for flue gas
7a Shut-off apparatus for the export line for flue gas
8 Exit line for waste gas
8a Shut-off apparatus for the export line for waste gas
9 Waste gas collection line
10 Waste gas purification system
11 Waste gas fan
12 Waste gas chimney

The invention claimed is:

1. A process for keeping coke oven chambers hot during the stoppage of a waste heat boiler, wherein
at least two coke oven chambers are combined to form a coke oven bench of the heat-recovery type, and a distinction is made between an operational period and a stoppage period of the coke oven bench, and
during the operational period, coking gas is used to heat a coke cake by combustion with air and to supply the heat required for coking, such that a hot flue gas is produced, which is guided into a waste heat boiler where said flue gas is used to produce steam or hot water, and
during the operational period, the hot flue gas is guided via a collection line from the coke chamber ovens into the waste heat boiler and through a waste gas purification system, which purifies the cooled waste gas from the waste heat boiler for emission-free exportation into the atmosphere, and
during the stoppage period, the coke oven chambers are emptied, such that they no longer contain any coal or any coke,
wherein
during the stoppage period, the coke oven chambers are kept hot using at least one externally fueled burner, such that a hot flue gas, which comes from the flue gas of the burners, is also provided during the stoppage period forming a gas flow in the collection line, and
during the stoppage period, the gas flow in the collection line is shut off upstream of the waste heat boiler, the hot flue gas of the burners being conducted not into the waste heat boiler but into a flue gas chimney, which is located upstream of the waste heat boiler, as a result of which
excessive emission of pollutants during the stoppage of waste heat boilers of coke oven benches is avoided.

2. The process as claimed in claim 1, wherein the burner or burners is or are fueled by natural gas, another gas or by liquid fuels.

3. An apparatus for keeping coke oven chambers hot during the stoppage of a waste heat boiler, comprising
at least two coke oven chambers, which are combined to form a coke oven bench,
a collection line for each coke oven bench, which receives hot flue gases from combustion of coking gas from the coke oven chambers of the coke oven bench and which issues from each respective coke oven bench into a common export line,
a waste heat boiler, which is supplied with hot flue gases from said common export line and which is equipped with at least one feed line for boiler feedwater, a discharge line for steam or hot water, and an exit line for cooled waste gas, wherein heat is indirectly transferred by heat exchange between the hot flue gases from the combustion of the coking gas and the boiler feedwater cooling medium, wherein
the collection line is equipped with a shut-off apparatus upstream of the entry of the flue gas into the waste heat boiler, and said collection line is furthermore equipped with a waste gas chimney which exports the waste gas vertically upward upstream of the shut-off apparatus in the gas flow direction,
a waste gas line, which exports cooled waste gas from the waste heat boiler exit, said waste gas line being equipped with a shut-off apparatus,
a waste gas purification system, which purifies the cooled waste gas from the waste heat boiler for emission-free exportation into the atmosphere,
wherein
each coke oven chamber is equipped with at least one externally heated burner which can be used to heat the coke oven chamber.

4. The apparatus as claimed in claim 3, wherein upstream of the waste heat boiler a flue gas chimney is provided, the flue gas chimney equipped with a shut-off apparatus.

5. The apparatus as claimed in claim 3, wherein the waste gas line for the cooled waste gas is provided with a suction fan, which can be used to produce a negative pressure.

6. The apparatus as claimed in claim 3, wherein the coke oven chambers are coke oven chambers which export the completely combusted coking gas as flue gas.

7. The apparatus as claimed in claim 3, wherein the apparatus comprises a waste gas purification system.

* * * * *